United States Patent
Birukov et al.

(12) 
(10) Patent No.: US 6,319,869 B1
(45) Date of Patent: Nov. 20, 2001

(54) METHOD OF MANUFACTURING A REFRACTORY ARTICLE AND A REFRACTORY ARTICLE MANUFACTURED THEREBY

(75) Inventors: Anatoly Birukov; Sergey Gordeev; Vladimir Morozov; Sergey Zhukov, all of St. Petersburg (RU)

(73) Assignee: Frenton Ltd., Douglas (GB)

( * ) Notice: Subject to any disclaimer, the term of this patent is extended or adjusted under 35 U.S.C. 154(b) by 0 days.

(21) Appl. No.: 09/381,853

(22) PCT Filed: Mar. 27, 1997

(86) PCT No.: PCT/EP97/01566

§ 371 Date: Dec. 27, 1999

§ 102(e) Date: Dec. 27, 1999

(87) PCT Pub. No.: WO98/43926

PCT Pub. Date: Oct. 8, 1998

(51) Int. Cl.[7] ............ C04B 35/03; C04B 35/52; C04B 35/00; H01K 21/00; B23K 1/19
(52) U.S. Cl. ............ 501/94; 228/262.1; 228/262.7; 228/262.71; 29/25.01; 501/87; 501/96.1
(58) Field of Search .............. 228/262.1, 262.7, 228/262.71; 29/25.01; 501/87, 94, 96.1

(56) References Cited

U.S. PATENT DOCUMENTS

| 3,725,015 | 4/1973 | Weaver ................. 29/182.1 |
| 4,326,992 | 4/1982 | Slaugh et al. ............ 252/443 |

FOREIGN PATENT DOCUMENTS

| 44 13 859 | 10/1995 | (DE) . |
| 94043034/33 | 5/1997 | (RU) . |

*Primary Examiner*—Jezia Riley
(74) *Attorney, Agent, or Firm*—Young & Thompson

(57) ABSTRACT

A refractory material powder of a carbide-forming metal or alloy is formed into an intermediate body having a shape and size corresponding to the desired shape and size of the article. The intermediate body is exposed to a gaseous hydrocarbon or a mixture of hydrocarbons at a temperature exceeding the decomposition temperature for the hydrocarbon or hydrocarbons until the mass of the intermediate body has increased by at least 3%. The intermediate body is thereafter exposed to a temperature of 1000–1700° C. in an inert atmosphere if the temperature during exposure to the hydrocarbon or hydrocarbons was too low to ensure a complete carbidization of the intermediate body.

28 Claims, 1 Drawing Sheet

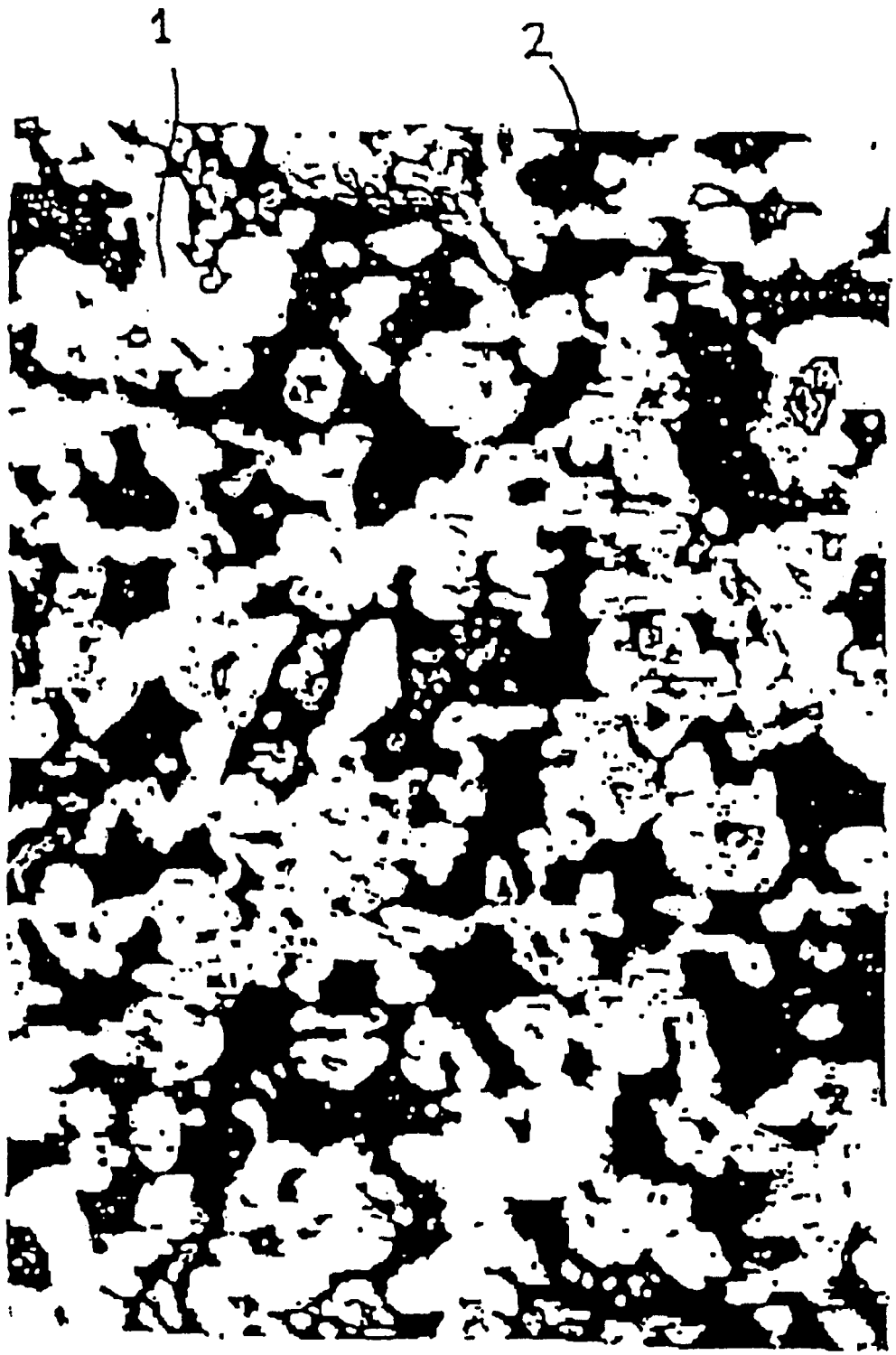

METHOD OF MANUFACTURING A REFRACTORY ARTICLE AND A REFRACTORY ARTICLE MANUFACTURED THEREBY

FIELD OF THE INVENTION

The present invention relates to a method of forming a refractory article including the step of forming a refractory material powder into an intermediate body having a shape and size corresponding to the desired shape and size of the article, and an refractory article manufactured by this method.

BACKGROUND OF THE INVENTION

Refractory articles made of carbides or comprising carbide components are known to have good properties when used under high temperature conditions. It is therefore desirable to use constructional materials comprising carbide components for heat resistant materials; erosion-resistant materials for electrical technology, which can be used under operating conditions in air; materials for high-temperature heat storage; materials for ablation heat-reflecting systems; and abrasion-resistant and tribotechnical materials. However, it is a problem to produce such articles having a desired shape, especially if the articles shall have a complex form.

U.S. Pat. No. 3,189,472 and U.S. Pat. No. 3,205,043 disclose a method of manufacturing a composite refractory article. This method comprises the steps of mixing of a silicon carbide powder and a carbonaceous material, subsequent forming of an intermediate product by pressing and filling the product containing the silicon carbide and the carbon with silicon. The last step was realized with the use of silicon vapor or molten silicon at a temperature exceeding the melting-point of the silicon.

While penetrating the intermediate product, the silicon is bonded into a secondary silicon carbide using the carbon from the product. By the known method a composite refractory article is obtained. Such an article has a high level of residual stress, moreover it is prone to cracking. U.S. Pat. No. 3,725,015 discloses another method of manufacturing a composite refractory article. The article produced thereby is based on at least one refractory compound. The known method includes the following steps:

mixing of a refractory material powder with a carbonaceous substance;

forming from the mixture obtained an intermediate product of a necessary form and size by pressing;

heating of the obtained intermediate product in order to allocate carbon from the carbonaceous substance;

filling said intermediate product with a molten metal or a mixture of metals, containing 74–99% vol. of at least a metal chosen from the group consisting of: Si, Cr, Fe, Ni, Ti and 1–25% vol. of metal (mixture) chosen from the group, consisting of: Al, Cu, Co, Fe and their mixtures, 0–24% vol. of a metal, which constitutes the metal portion of the refractory material.

This known method does not eliminate residual stress in the product completely, though the level is reduced. Articles having a complicated shape cannot be produced with accuracy by this method due to great shrinkage of the article during the heat treatment. The article produced by this method can have a closed porosity. Such a kind of porosity makes it difficult for a molten metal (mixture) to penetrate into the intermediate product. A complicated equipment for maintaining necessary high temperatures is needed to perform this method.

An article produced by said method represents at least a triple system, consisting of a sintered refractory compound from the group including boron carbide, boron silicide, titanium boride, titanium carbide, zirconium carbide, zirconium boride, silicon nitride, beryllium carbide, boron carbide, their mixtures and an alloy, consisting of at least two metals. A residue volume of space between particles of the article is filled up with said alloy, one of its metal components being the same as the metal forming the refractory material, and another one chosen from the group consisting of: aluminium, copper, cobolt, iron, and their mixtures.

An article produced by said method has a porosity of 10–40% vol.; the space between the article particles which is occupied by the metal carbide is 5–35% vol. The rest 5–35% vol. of said space is occupied by the alloy.

SUMMARY OF THE INVENTION

It is an object of the present invention to provide a method for manufacturing a refractory article having a desired shape in a simple way and with simple and inexpensive equipment. Moreover, thermal stresses and microcracking in the article produced should be minimized and an open porosity should be existant throughout the whole volume of the article. Finishing of the article produced should also be minimized.

A further object of the invention is to provide composite refractory articles having high physico-mechanical properties, high level of electric conductivity, heat capacity, hardness and abrasion resistance; being suitable for use in several technical areas, also at high temperatures and even at temperatures higher than the melting point of the metal phase filling the pores of an intermediate body produced by the method according the invention.

This object is accomplished by a method of forming a refractory article including the step of forming a refractory material powder into an intermediate body having a shape and size corresponding to the desired shape and size of the article, characterized by chosing a carbide-forming metal or alloy as material for the intermediate body, exposing the intermediate body formed to a gaseous hydrocarbon or a mixture of hydrocarbons at a temperature exceeding the decomposition temperature for the hydrocarbon or hydro carbons until the mass of the intermediate body has increased by at least 3%, and thereafter exposing the intermediate body to a temperature of 1000–1700° C. in an inert atmosphere. The body formed by this method consists of a continuous spatial skeleton of carbide material having open pores, such a material in itself being useful as a heat-resistant structural material. Such a porous carbide skeleton material could also be used for filters, catalyst substrates, and various types of electrochemical electrodes. Moreover, such a material is excellent as a starting material for producing a composite refractory article by filling the open pores with different metals or metal alloys in order to create a composite refractory article having certain desired properties, such as a high electrical conductivity or a low friction coefficient. The last heating step facilitates such an metal infiltration.

In a first embodiment the intermediate body formed is exposed to a gaseous hydrocarbon or a mixture of hydrocarbons at a temperature exceeding the decomposition temperature for the hydrocarbon or hydrocarbons until the mass of the intermediate body has increased by 25%, at the most. The carbide-forming metal is preferably selected from the IV,V or VI group of the Periodic Mendeleyev System of Elements, more preferably from the group of Ti,Zr,Hf,V,Nb, Ta,Cr,Mo and W. It is also possible to use other carbide-forming metals, such as Al, and carbide-forming alloys. Forming of the intermediate body is preferably made by pressing.

Alternatively the intermediate body is formed by slip, slurry or tape casting.

The intermediate body is formed to have a porosity of 10–80% vol., preferably 20–60% vol. and more preferably 25–50% vol.

In the first embodiment the intermediate body is formed with an uniform porosity throughout the body volume.

In a second embodiment the intermediate body is formed with a different porosity in different parts of the body volume.

In both embodiments the step of exposing the intermediate body formed to a gaseous hydrocarbon or a mixture of hydrocarbons consists of exposing the intermediate body formed to a natural gas at a temperature of 750–950° C. or to a gas or a mixture of gases from the group of acetylene, methane, ethane, propane, pentane, hexane, benzene and their derivatives at a temperature of 550–1200° C.

Both embodiments could advantageously include the further step of saturating the carbide skeleton body with a molten metal comprising at least one metal from or an alloy based on at least one metal from the group consisting of Ag,Cu,Ga,Ti,Ni,Fe, and Co. Before the saturating step the carbide skeleton body is heated to a temperature of 1000–1700° C. in an inert atmosphere (vacuum, argon or otherwise alternative means) in order to facilitate the infiltration of the molten metal. Such a heat treatment would also ensure complete carbidization of the carbide skeleton body if the foregoing step of exposing the intermediate body to a gaseous hydrocarbon or a mixture of hydrocarbons at a temperature exceeding the decomposition temperature for the hydrocarbon or hydrocarbons until the mass of the intermediate body has increased by at least 3% has been performed at a temperature too low to ensure a complete carbidization of the intermediate body.

In an alternative embodiment the pores in a part of the metal carbide skeleton are filled with at least one metal from or a metal alloy based on a metal from the group of Ag,Cu,Ga,Ta,Ni,Fe, and Co.

In another alternative embodiment the walls of the open pores of the carbide skeleton body are coated with a metal layer comprising at least one metal from or an alloy based on at least one metal from the group consisting of Ag,Cu, Gi,Ti,Ni,Fe and Co. In order to enhance catalytic properties of the carbide skeleton body, elements such as V,Cr,Pt and Pd might be added to the metal or metal alloy.

The invention also relates to a refractory article, characterized in that it comprises a metal carbide skeleton having a porosity of 8–75% vol., preferably 15–55% vol. and more preferably 20–45% vol, the metal component being a metal or a metal alloy. The metal component is preferably selected from the IV,V or VI group of the Periodic Mendeleyev System of Elements.

In a first embodiment the metal component is selected from the group of Ti, Zr, Hf, V, Nb, Ta, Cr, Mo and W. The pores in the whole or part of the metal carbide skeleton are preferably filled with at least one metal from or a metal alloy based on a metal from the group of Ag, Cu, Ga, Ti, Ni, Fe, and Co and the metal carbide skeleton has an uniform porosity throughout its body volume. In an alternative embodiment the walls of the pores in the carbide skeleton are coated with a metal layer, said layer might contain additional elements for enhancing catalysis.

In a second embodiment the metal carbide skeleton has different porosity in different parts of its body volume.

BRIEF DESCRIPTION OF THE DRAWINGS

The invention will now be described with reference to the enclosed drawing, schematically showing the structure of a refractory article according to an embodiment of the invention.

DETAILED DESCRIPTION OF THE PREFERRED EMBODIMENTS

In order to manufacture a refractory article having the structure shown in the drawing, a powder of carbide-forming metal is formed to a shape and size corresponding to the desired shape and size of the article. The forming is performed by filling the powder into a mold and exposing the powder to pressure. Alternatively the forming could be made by slip, slurry or tape casting.

The carbide forming metal is preferably selected from the group comprising metals of IV, V or VI groups of the Periodic Mendeleyev's System of Elements, such as titanium, zirconium, hafnium, vanadium, niobium, tantalum, molybdenum, chromium, tungsten.

By selecting the size of the particles in the carbide-forming metal powder and the conditions of forming, an intermediate body with a desired porosity (content and pore size) can be produced. For obtaining a skeleton carbide body according to the disclosed embodiment which is to be exposed to severe mechanical stresses at high temperatures the porosity of the intermediate body should lie within the the range of 20–60% vol., preferably within 25–50% vol. A porosity less than 20% vol. is an obstruction to further method steps, such as forming an open pored intermediate body, heat treating the intermediate body in a medium of hydrocarbon and filling the pores of the obtained carbide skeleton body with a metal phase. For an intermediate body having a porosity less than 20% vol., the metal phase in the produced article would not be continuous, the desired properties depending on the metal phase content thereby being seriously decreased. A porosity above 60% vol. would make the mechanical strength of the continuous carbide skeleton formed in the heat treatment step following the forming very poor.

For articles, such as filters, catalyst substrates, and various types of electrochemical electrodes, having lower demands on the mechanical strength of an porous carbide skeleton body or lower demands on the metal phase in a composite body, porosities outside the abovementioned range can be used. However, a skeleton carbide body having a lower porosity value than 8% vol. or a higher porosity value than 75% vol. will have too poor performance to be useful.

The porosity can also to some extent be controlled by the pressure applied, the higher the pressure, the lower the porosity. Furthermore, the porosity can be varied by mixing the metal particles with pore formers which are removed after the forming step. It is also possible to make a laminar intermediate body by using tape casting with different porosity or different metal grain size and binding together the bodies produced.

It is also pointed out that it is possible to obtain different porosities in different parts of the intermediate body by filling the mold with particles of different sizes in different parts of mold.

The next step is to expose the formed intermediate body to a gaseous flow of hydrocarbon or a mixture of hydrocarbons at a temperature exceeding the decomposition temperature for the hydrocarbon or hydrocarbons.

In order to do so the intermediate body is taken out of its mold and placed in an isothermic reactor of pyrocarbon synthesis. A flow of natural gas is introduced into the reactor at a temperature of 750–950° C. and pyrocarbon is being formed in the body volume from natural gas in accordance with the chemical reaction:

$$C_mH_c = mC + n/2 \times H_2$$

The flow of natural gas is maintained until the mass of the intermediate body has increased by 3–25%.

Instead of natural gas the intermediate body could for example by exposed to a gas or a mixture of gases from the group of acetylene, methane, ethane, propane, pentane, hexane, benzene and their derivatives. When using such hydrocarbons the temperature during this method step must be chosen so that a chemical reaction of pyrocarbon synthesis takes place on all solid surfaces accessible to the gas agent. The temperature of the process must be higher than the temperature, at which the hydrocarbon or the hydrocarbons decompose. For the above mentioned hydrocarbons the temperature needed is 500–1200° C. The heat treatment is to be carried on for as long as it takes to get the desired increase in mass of the intermediate body.

The increase in mass of the intermediate body is to be previously evaluated with regard to stoichiometric metal-pyrocarbon ratio made possible the formation of a carbide skeleton.

The increase in mass of the intermediate body will change the shape of this body in a microscale perspective, the porosity thereof being reduced. However, in a macroscale perspective the shape and size of the intermediate body formed in the forming step will not undergo any noticable change. The carbide skeleton body obtained after the desired increase in mass has thus in a macroscale perspective the same shape and size as the intermediate body taken out of its mold.

The carbide skeleton body is thereafter heated to a temperature of 1000–1700° C. in an inert atmosphere (vacuum, argon or other alternative means) in order to facilitate an infiltration of a molten metal into the pores thereof.

In the last step of the preferred embodiment of the invention the carbide skeleton so obtained is filled with a molten metal comprising at least one metal from or an alloy based on at least one metal from the group consisting of Ag,Cu,Ga,Ti,Ni,Fe, and Co.

Said filing is carried out by dipping said carbide skeleton into a fluid metal (or a metal mixture), by melting a metal cast placed on a surface of said body or by pouring or by other means applying a fluid metal on a surface of said carbide skeleton. The temperature during the filling must be above the melting-point for the metal used. For example it is 1300–1350° C. for copper; 1500–1700° C. for iron-based alloys; 1000–1050° C. for the Cu—Ga (4:1) alloy and so on. If an incompletely carbidized skeleton body is used the filling temperature is to be high enough for ensuring a complete carbidization of the carbide skeleton body, which is ensured by the step of exposing said carbide skeleton body to a temperature of 1000–1700° C. in an inert atmosphere before the filling, the surface wetting of said body after that being favourable. The filling is to be carried out until all pores of the intermediate body have been completely filled.

If the increase in mass of the intermediate body is greater than needed for a complete carbidization of the intermediate body, the further step of metal filling is connected with difficulties by reason of non-bonded carbon.

It is also possible to only saturate a part of the intermediate body with a molten metal comprising at least one metal from or an alloy based on at least one metal from the group consisting of Ag,Cu,Ga,Ti,Ni,Fe, and Co, for example by only dipping a part of the body in a bath of molten metal.

It is even possible to obtain only a coating of the walls of the open pores of the intermediate body with a metal layer comprising at least one metal from or an alloy based on at least one metal from the group consisting of Ag,Cu,Ga,Ti, Ni,Fe, and Co.

The unique characteristics of the described method embodiment are that the intermediate body is formed from metal powder into a porous intermediate body and thereafter transformed into a single continuous carbide having a continuous spatial skeleton obtained by the carbide synthesis taking place in the whole volume of the intermediate body. The porosity of such a skeleton carbide material is preferably 15–55% vol. For optimum properties the porosity of the skeleton carbide material is more preferably 20–45% vol. As this takes place all the material pores remain open.

Thereafter said pores are completely filled with a fluid metal. Being solidified the final article has a structure formed of two continuous spatial skeletons which are penetrated inside one another. It is very easy to vary the properties of such a system by chosing the porosity of the carbide skeleton body and the metal with which it is filled in order to have materials suitable for use in different fields. The final article made by this method has a metal content of 15–55% vol., preferably 20–45% vol.

By the method embodiment described above a composite refractory article having a desired shape and size is obtained, no change of the macroscopic size and shape of the formed intermediate body occurs during the subsequent method steps. Such an article constitutes a binary system consisting of two phases, one phase being a continuous spatial porous refractory carbide skeleton 1 and the other being a metal phase 2 filling all the skeleton pores.

Even if the metal is practically molten during use, the carbide skeleton carrying capacity does not change. The unification of the high stable carbide skeleton and the metal phase makes it possible to produce articles with properties of high levels of performance such as: high resistance to intense flux of heat; selflubrication in circumstances of dry friction; high damping capacity; high erosion-resistance under conditions of high electric currents and high voltage and other properties.

A composite refractory article according to the present invention has a high strength at temperatures above the melting-point for the metal phase; the article strength being that of the carbide skeleton. When used at high temperatures (800–1500° C.) said refractory article maintain its shape and size unlike matrix-type materials which completely lose their shape under such conditions.

Being heated an article according to the present invention maintains its shape, size, structure and properties as the molten metal is kept in the carbide skeleton by capillary action. Testing of the articles has proved that their mechanical properties are maintained to a great extent (>75%) when the articles are exposed to high temperatures (800–1000° C.).

The sum of unique properties of the articles produced according to the present invention makes it possible to use them as heat resistant structural materials; abrasion-resistant materials; erosion-resistant materials for plasmatron electrodes; erosion-resistant materials for heavy-current electrocontacts; materials for arc-electrodes; high-temperature heat-storage means, ablation heat-reflecting systems; tribotechnical means (friction, antifriction); heat-resistant damping materials and electrodes in sparking-plugs.

While being at work in a plasmatron the composite refractory electrode with the carbide skeleton demonstrated the capacity to withstand a heat in excess of the fusing point for the metal phase. In this case, molten metal is being maintained within the carbide skeleton by capillary forces and the electrode is still functioning. The use of a composite skeleton electrode for plasmatron permits to increase their capacity for continuous work by a factor of tens, while increasing the required power.

One of the important advantages of the invention is the capability of controlling the required or desired shape and size of a final product. Thereby finishing of the final product produced by the inventive method is almost completely eliminated, the machining of hard materials being reduced to a minimum.

Other important advantages of such a product is a broad spectrum of structures and properties of the same starting materials and as a consequence a broad spectrum of possible areas of application of materials in a given technical domain.

The following examples, demonstrate several aspects of the invention.

EXAMPLE 1

A cylindrical intermediate body having a diameter of 12 mm, a length of 30 mm and a porosity of 55% vol. was formed in a mold from chromium powder with a size of 10 $\mu$m under a pressure of 30 MPa. The body had uniform porosity in the whole body volume.

Thereafter, the obtained intermediate body was placed in an isothermic reactor for pyrocarbon synthesis. Pyrocarbon was formed in the body volume from natural gas at a temperature of 870° C. in accordance with the chemical reaction:

$$C_mH_n = mC + n/2 \times H_2$$

The intermediate body was treated in such a way for about 8 hours, the time necessary to increase its mass by 13–14%. The duration of the treatment depends on size and value of the porosity of the article being treated.

By a subsequent treatment said body was filled in with molten copper at a temperature of 1300–1350° C., the treatment time was 5 minutes. The size and shape of the article thus obtained were the same as after the pyrocarbon synthesis.

The final article containes chromium carbide 55% vol. and copper 45% vol.

The basic properties of the obtained composite refractory article were: a density of 7.5 g/cm$^3$, a Young's modulus of 250 GPa; a bending strength of 500 MPa for three-point loading at a temperature of 20° C.; and a hardness of 25 HRC. Articles so obtained were tested as uncooled plasmatron electrodes and demonstrated high performance. The operation conditions were following: I=2.2–7.9 A, U=960–1200 V. The results of the test are shown in a table 1.

TABLE 1

| Article composition | U, (V) | I, (A) | t (hours) | Q, (C) | Mass loss ($\Delta$m), (g) | $\Delta$m/Q ($\mu$g/C) |
|---|---|---|---|---|---|---|
| Cr$_3$—Cu | 1200 | 2.2 | 100 | 792000 | 1.75 | 2.2 |
|  | 1200 | 4.5 | 10 | 162000 | 1.04 | 6.4 |
|  | 960 | 7.9 | 10 | 284400 | 3.03 | 10.8 |
| Cu | 760 | 2.4 | 10 | 68400 | 119.2 | 1380 |

As is evident from Table 1, the electrode produced according to the invention being a binary system, consisting of Cr$_3$C$_2$ and Cu, had superior properties regarding $\Delta$m/Q as compared to a Cu—electrode by a factor of 630 while the plasmatron power was higher than for the Cu—electrode by a factor of 1.45 for similar currents (2.2 A versus 2.4 A).

EXAMPLE 2

An intermediate body having a diameter of 12 mm and a length of 150 mm were formed from chromium powder with a size of 10 $\mu$m by pressing. The body formed had different porosities in different parts thereof; at the body ends a porosity of 30% vol., and in the middle of the body a porosity of 50% vol. The body was formed in a mold having two pistons, the pressure was 20 MPa.

Said body went through the same method steps as the body in Example 1. However, silver was used to fill the pores of the intermediate body of example 2. The obtained article after being divided into two equal parts with the diameter of 12 mm and the height of 75 mm, was used as uncooled plasmatron electrodes in the same way as stated above. Both of said article parts had different silver content in different parts; the silver content increasing from a value of 20% vol. in one end to a value of 39% vol. in the other end.

The HRC hardness values varied along the length of said article parts from 65 to 40, respectively. Being used as plasmatron electrodes, the article parts were placed so that the ends with lesser concentration of silver were subjected to erosion. The other portions of said article parts with more silver content had a higher conductivity.

EXAMPLE 3

An intermediate body having a ring shape with an outer diameter of 30 mm, an inner diameter of 24 mm and a height of 10 mm and a porosity of 50% vol. was formed from chromium powder by slurry casting with phenolformaldehyde resin as a temporary binder. Said body was kept 20 hours in air at a temperature of about 20° C. to remove volatiles, then heat treated at a temperature of 70° C. during 4 hours and thereafter exposed to a temperature of 160° C. during 1 hour to polymerize the temporary binder.

Thereafter said body was treated in a medium of methane at a temperature of 1000° C. The increase in mass of the intermediate body was 13–14%. A heat treatment was carried out at 1350° C. A molten alloy of copper and gallium in a mass relationship 4:1 was used to fill up the body. Said filling lasted for 5 minutes at a temperature of 950–1000° C. The obtained composite refractory material had a bending strength of 380 MPa (at a temperature of 20° C.). Said article being used as a member of an antifriction pair, the other member of the pair being of 40X steel (chromium containing steel) with a hardness of 60 HRC, demonstrated a factor of friction of 0.12 at a velocity of 2.4 m/sec and a pressure of 0.68 MPa.

EXAMPLE 4

An intermediate plane body was formed from titanium powder, having a particle size of 16 µm, to a porosity of 40% vol. by pressing. Thereafter, the method was carried out in the same way as in Example 1. However, the exposing to a gaseous hydrocarbon lasted until the body mass had increased by 22%. Thereafter said intermediate body was heat treated at a temperature of 1650° C. during 15 minutes in vacuum. The filling was made by means of a molten alloy or iron, chromium and aluminum in a mass relationship of 84%, 15% and 1%, respectively, at a temperature of 1500° C. during 10 minutes. The obtained composite refractory article had a HRC hardness of 25–30 minutes.

EXAMPLE 5

An intermediate body having a diameter of 20 mm and a height of 3 mm was formed from niobium powder with a size of 40 µm to a porosity of 30% vol. Thereafter said body was treated in a medium of natural gas at a temperature of 850° C. The increase in mass of the intermediate body was 11%. A heat treatment was carried out at 1700° C. during 20 minutes. Molten nickel was used to fill up said body. It took 10 minutes to fill up the body at a temperature of 1600° C. The Young's modulus of the obtained article was 250 GPa.

In the examples given above the following methods were used to determine the properties of the different articles produced:

1. Density was determined by calculating the article mass to volume ratio. The article volume was determined by hydrostatics using the mass difference in air and water. While determining the volume of porous articles they were previously saturated with molten paraffin.
2. Young's modulus and bending strength was determined by means of three-point loading using samples with 5×5×50 mm sizes on a 40 mm base.
3. Hardness—by Rockwell HRC scale.
4. Erosion stability was measured for a plasmatron arc in conditions shown in Example 1.
5. A friction was measured in conditions shown in Example 4.

What is claimed is:

1. A method of forming a refractory article including the step of forming a powder material into an intermediate body having a shape and size corresponding to the desired shape and size of the article, characterised by choosing a carbide-forming metal or metal alloy as material for the intermediate body, exposing the intermediate body formed to a gaseous hydrocarbon or a mixture of hydrocarbons at a temperature exceeding the decomposition temperature for the hydrocarbon or hydrocarbons until the mass of the intermediate body has increased by at least 3%, and thereafter exposing the intermediate body to a temperature of 1000–1700° C. in an inert atmosphere, thereby creating a continuous metal carbide skeleton body.

2. The method according to claim 1, characterised by forming the intermediate body with a porosity of 10–80% vol.

3. The method according to claim 1, characterised by exposing the intermediate body formed to a gaseous hydrocarbon or a mixture of hydrocarbons at a temperature exceeding the decomposition temperature for the hydrocarbon or hydrocarbons until the mass of the intermediate body has increased by 25%, at the most.

4. The method according to claim 1, characterised by selecting the carbide-forming metal or a compound of the metal alloy from the IV, V or VI group of the Periodic Mendeleyev System of Elements.

5. The method according to claim 4, characterised by selecting the carbide-forming metal or a component of the metal alloy from the group of Ti, Zr, Hr, V, Nb, Ta, Cr, Mo, and W.

6. The method according to claim 1, characterised by forming the intermediate body by pressing.

7. The method according to claim 1, characterised by forming the intermediate body by slip, slurry or tape casting.

8. The method according to claim 1, characterised by forming the intermediate body with a uniform porosity throughout the body volume.

9. The method according to claim 1, characterised by forming the intermediate body with a different porosity in different parts of the body volume.

10. The method according to claim 1, characterised by forming the intermediate body to have a porosity of 20–60% vol.

11. The method according to claim 1, characterised in that the step of exposing the intermediate body formed to a gaseous hydrocarbon or a mixture of hydrocarbons consists of exposing the intermediate body formed to a natural gas at a temperature of 750–950° C., thereby creating a continuous metal carbide skeleton body.

12. The method according to claim 1, characterised in that the step of exposing the intermediate body formed to a gaseous hydrocarbon or a mixture of hydrocarbons consists of exposing the intermediate body formed to a gas or a mixture of gases from the group of acetylene, methane, ethane, propane, pentane, hexane, benzene and their derivatives at a temperature of 550–1200° C., thereby creating a continuous metal carbide skeleton body.

13. The method according to claim 1, characterized by the further step of saturating the continuous metal carbide skeleton body with a molten metal comprising at least one metal from or an alloy based on at least one metal from the group consisting of Ag, Cu, Ga, Ti, Ni, Fe, and Co.

14. The method according to claim 1, characterised by the further step of saturating a part of the continuous metal carbide skeleton body with a molten metal comprising at least one metal from or an alloy based on at least one metal from the group consisting of Ag, Cu, Ga, Ti, Ni, Fe, and Co.

15. The method according to claim 1, characterised by coating walls of open pores of the continuous metal carbide skeleton body with a metal layer comprising at least one metal from or an alloy based on at least one metal from the group consisting of Ag, Cu, Ga, Ti, Ni, Fe, and Co.

16. The method according to claim 15, characterised by adding an element or elements from the group consisting of V, Cr, Pt, and Pd to the metal or metal alloy.

17. A refractory article, characterised in that it consists of a single continuous metal carbide skeleton body having a porosity of 8–75% vol, the metal component being a metal or a metal alloy.

18. The article according to claim 17, characterised in that it consists of a single continuous metal carbide skeleton body having a porosity of 15–55% vol.

19. The method according to claim 17, characterised in that the metal component is selected from the IV, V or VI group of the Periodic Mendeleyev System of Elements.

20. The article according to claim 19, characterised in that the metal component is selected from the group of Ti, Zr, Hf, V, Nb, Ta, Cr, Mo and W.

21. The article according to claim 17, characterised in that the continuous metal carbide skeleton body has an uniform porosity throughout its body volume.

22. The article according to claim 17, characterised in that the continuous metal carbide skeleton body has different porosity in different parts of its body volume.

23. The article according to claim 18, characterised in that the pores in the continuous metal carbide skeleton body are filled with at least one metal from or an alloy based on at least one metal from the group of Ag, Cu, Ga, Ti, Ni, Fe, and Co.

24. The article according to claim 18, characterised in that the pores in a part of the continuous metal carbide skeleton body are filled with at least one metal from or an alloy based on at least one metal from the group of Ag, Cu, Ga, Ti, Ni, Fe, and Co.

25. The article according to claim 18, characterized in that walls of open pores of the continuous metal carbide skeleton body are coated with a metal layer comprising at least one metal from or an alloy based on at least one metal from the group consisting of Ag, Cu, Ga, Ti, Ni, Fe, and Co.

26. The article according to claim 25, characterised in that an element or elements from the group consisting of V, Cr, Pt and Pd is added or are added to the metal or metal alloy.

27. The method according to claim 10, characterised by forming the intermediate body to have a porosity of 25–50% vol.

28. The article according to claim 18, characterised in that it consists of a single continuous metal carbide skeleton body having a porosity of 20 . 45% vol.

* * * * *